United States Patent
Ando et al.

(10) Patent No.: US 10,026,556 B2
(45) Date of Patent: Jul. 17, 2018

(54) ELECTRONIC COMPONENT

(71) Applicant: TDK CORPORATION, Tokyo (JP)

(72) Inventors: Norihisa Ando, Tokyo (JP); Atsushi Takeda, Nikaho (JP); Hideki Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 4 days.

(21) Appl. No.: 15/276,172

(22) Filed: Sep. 26, 2016

(65) Prior Publication Data

US 2017/0098506 A1   Apr. 6, 2017

(30) Foreign Application Priority Data

Oct. 6, 2015 (JP) .................... 2015-198329

(51) Int. Cl.
| | |
|---|---|
| *H01G 4/30* | (2006.01) |
| *H01G 4/005* | (2006.01) |
| *H01G 4/228* | (2006.01) |
| *H01G 4/232* | (2006.01) |
| *H01G 4/12* | (2006.01) |

(52) U.S. Cl.
CPC .............. *H01G 4/30* (2013.01); *H01G 4/005* (2013.01); *H01G 4/228* (2013.01); *H01G 4/232* (2013.01); *H01G 4/2325* (2013.01); *H01G 4/12* (2013.01)

(58) Field of Classification Search
CPC .......... H01G 4/30; H01G 4/005; H01G 4/232; H01G 4/2325; H01G 4/248; H01G 4/12
See application file for complete search history.

(56) References Cited

U.S. PATENT DOCUMENTS

| | | | |
|---|---|---|---|
| 6,381,117 B1* | 4/2002 | Nakagawa | H01G 2/14 361/301.4 |
| 2008/0073108 A1 | 3/2008 | Saito et al. | |
| 2010/0302704 A1* | 12/2010 | Ogawa | H01G 4/2325 361/306.3 |
| 2013/0182368 A1* | 7/2013 | Jeon | H01G 4/30 361/301.4 |
| 2013/0182369 A1* | 7/2013 | Jeon | H01G 4/30 361/301.4 |
| 2013/0242457 A1* | 9/2013 | Lee | H01G 4/008 361/301.4 |
| 2014/0085770 A1* | 3/2014 | Park | H01G 4/30 361/305 |
| 2016/0027583 A1* | 1/2016 | Ahn | H01G 4/30 361/301.4 |
| 2016/0095223 A1* | 3/2016 | Yoshida | H01G 4/2325 174/260 |

FOREIGN PATENT DOCUMENTS

JP   2008-085280 A   4/2008

* cited by examiner

*Primary Examiner* — Dion R Ferguson
(74) *Attorney, Agent, or Firm* — Oliff PLC

(57) ABSTRACT

An electronic component includes an element body having a pair of end surfaces opposing each other and a side surface adjacent to the pair of end surfaces, and an external electrode disposed on at least the end surface. The external electrode includes a conductive resin layer located on at least the end surface. A first thickness of the conductive resin layer located on a central region of the end surface is greater than a second thickness of the conductive resin layer located on a peripheral region of the end surface.

34 Claims, 12 Drawing Sheets

ELECTRONIC COMPONENT

TECHNICAL FIELD

The present invention relates to an electronic component.

BACKGROUND

Known electronic components include an element body having a pair of end surfaces opposing each other and a side surface adjacent to the pair of end surfaces, and an external electrode disposed on at least the end surfaces (see, for example, Japanese Unexamined Patent Publication No. 2008-85280). In the electronic component described in Japanese Unexamined Patent Publication No. 2008-85280, the external electrode includes a conductive resin layer located on at least the end surface.

SUMMARY

An object of an aspect of the present invention is to provide an electronic component in which stress by a solder fillet is sufficiently relaxed, and an amount of a conductive resin used for forming a conductive resin layer can be reduced.

The electronic component including the external electrode is mounted by soldering, for example, to another electronic device (such as a circuit board or an electronic component). A solder fillet is formed on the external electrode by solidification of molten solder. Stress is generated in the solder fillet when the molten solder is solidified. In the electronic component according to the above-described one aspect, the external electrode includes the conductive resin layer, and therefore the stress by the solder fillet is relaxed by the conductive resin layer.

In a case where the conductive resin layer has a small thickness, an amount of a conductive resin used for forming the conductive resin layer (hereinafter simply referred to as "amount of a conductive resin used" in some cases) can be reduced in comparison with a case where the conductive resin layer has a large thickness. However, it is more difficult to relax the stress by a solder fillet in a case where the conductive resin layer has a small thickness, than in a case where the conductive resin layer has a large thickness.

Under such circumstances, the present inventors have conducted research and study for an electronic component in which stress by a solder fillet is sufficiently relaxed, and an amount of a conductive resin used can be reduced. As a result, the present inventors have found out the following facts and reached the present invention.

Stress by a solder fillet more strongly acts on a central electrode portion of an external electrode corresponding to a central region of an end surface, than on a peripheral electrode portion of the external electrode corresponding to a peripheral region of the end surface. In other words, the stress acting on the central electrode portion of the external electrode is greater than the stress acting on the peripheral electrode portion of the external electrode. When the conductive resin layer has a thickness with which the stress acting on the central electrode portion of the external electrode can be sufficiently relaxed, the stress by a solder fillet is sufficiently relaxed.

The stress acting on the peripheral electrode portion of the external electrode is less than the stress acting on the central electrode portion of the external electrode. Therefore, it is possible to make the thickness of the conductive resin layer located on the peripheral region of the end surface less than that of the conductive resin layer located on the central region of the end surface in a manner corresponding to the peripheral electrode portion of the external electrode of which the stress acting thereon is less than that of the central electrode portion of the external electrode. In this case, the thickness of the conductive resin layer located on the peripheral region of the end surface is made to be less than that of the conductive resin layer located on the central region of the end surface, and thus an amount of the conductive resin used can be reduced accordingly.

An electronic component according to one aspect of the present invention includes an element body having a pair of end surfaces opposing each other and a side surface adjacent to the pair of end surfaces, and an external electrode disposed on at least the end surface. The external electrode includes a conductive resin layer located on at least the end surface. A first thickness of the conductive resin layer located on the central region of the end surface is greater than a second thickness of the conductive resin layer located on the peripheral region of the end surface.

In the electronic component according to the above-described one aspect, the first thickness is greater than the second thickness, and therefore the stress by a solder fillet is sufficiently relaxed.

Since the second thickness is less than the first thickness, the amount of the conductive resin used can be reduced in the electronic component according to the above-described one aspect, in comparison with, for example, an electronic component in which the thickness of the conductive resin layer is the first thickness throughout the conductive resin layer.

The external electrode may be also disposed on the side surface, and the conductive resin layer may be also disposed on the side surface. In this case, a third thickness of the conductive resin layer located on the side surface may be greater than the second thickness.

When the electronic component is mounted by soldering on an electronic device in a state where the side surface opposes the electronic device, stress from the electronic device may also act on an electrode portion of the external electrode corresponding to the side surface. For example, when the electronic component is mounted by soldering on a circuit board, deflection stress acts also on the electrode portion of the external electrode corresponding to the side surface in accordance with deflection of the circuit board.

When the third thickness is greater than the second thickness, stress acting on the electrode portion of the external electrode corresponding to the side surface is relaxed in the electronic component of this embodiment, in comparison with, for example, an electronic component in which the third thickness is less than or equal to the second thickness.

The third thickness may be less than the first thickness. In the electronic component of this embodiment, the amount of the conductive resin used can be reduced in comparison with, for example, an electronic component in which the thickness of the conductive resin layer is the first thickness throughout the conductive resin layer.

The third thickness may be greater than the first thickness. In the electronic component of this embodiment, the stress acting on the electrode portion of the external electrode corresponding to the side surface can be relaxed in comparison with, for example, an electronic component in which the third thickness is less than or equal to the first thickness.

The external electrode may further include a sintered metal layer disposed on the element body. In this case, the conductive resin layer is disposed on the sintered metal layer. In the electronic component of this embodiment, fixing strength between the element body and the external electrode is improved.

The sintered metal layer may be disposed on the end surface and the side surface. In this case, a sixth thickness of the sintered metal layer located on the side surface may be less than the fourth thickness of the sintered metal layer located on the central region of the end surface, and greater than the fifth thickness of the sintered metal layer located on the peripheral region of the end surface. In the electronic component of this embodiment, since the fourth thickness is greater than the sixth thickness and the fifth thickness, fixing strength between the element body and the sintered metal layer is improved in a region on which the stress by a solder fillet strongly acts. Since the sixth thickness is greater than the fifth thickness, the fixing strength between the element body and the sintered metal layer is improved in a region on which the stress from the electronic device acts. As a result, in the electronic component of this embodiment, the fixing strength between the element body and the external electrode is further improved.

Surface roughness of the sintered metal layer located on the central region of the end surface may be greater than surface roughness of the sintered metal layer located on the peripheral region of the end surface. In the electronic component of this embodiment, fixing strength between the sintered metal layer and the conductive resin layer is improved in a region on which the stress by a solder fillet strongly acts.

Surface roughness of the sintered metal layer located on the side surface may be greater than the surface roughness of the sintered metal layer located on the peripheral region of the end surface. In the electronic component of this embodiment, the fixing strength between the sintered metal layer and the conductive resin layer is improved in a region on which the stress from the electronic device acts.

The sintered metal layer may be disposed on at lease the end surface. In this case, the fourth thickness of the sintered metal layer located on the central region of the end surface may be greater than the first thickness. In a case where an internal conductor is disposed in the element body, the internal conductor is often exposed to the central region of the end surface. Consequently, when the fourth thickness is greater than the first thickness in an electronic component including the internal conductor disposed in the element body, connectability between the internal conductor and the sintered metal layer is secured in comparison with, for example, an electronic component in which the fourth thickness is less than or equal to the first thickness.

The external electrode may further include the sintered metal layer disposed on the end surface and the side surface. The conductive resin layer may be disposed on the sintered metal layer and located on the end surface and the side surface. In this case, the third thickness of the conductive resin layer located on the side surface may be greater than the sixth thickness of the sintered metal layer located on the side surface. In the electronic component of this embodiment, the stress acting on the electrode portion of the external electrode corresponding to the side surface is relaxed in comparison with, for example, an electronic component in which the third thickness is less than or equal to the sixth thickness.

The external electrode may further include a plating layer disposed on the conductive resin layer. In this case, the electronic component of this embodiment is securely mounted by soldering on an electronic device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Hereinbelow, an embodiment of the present invention will be described in detail with reference to the accompanying drawings. In the description, the same components or components having the same function will be denoted by the same reference sign, and a repetitive description thereof will be omitted.

Figure 1:
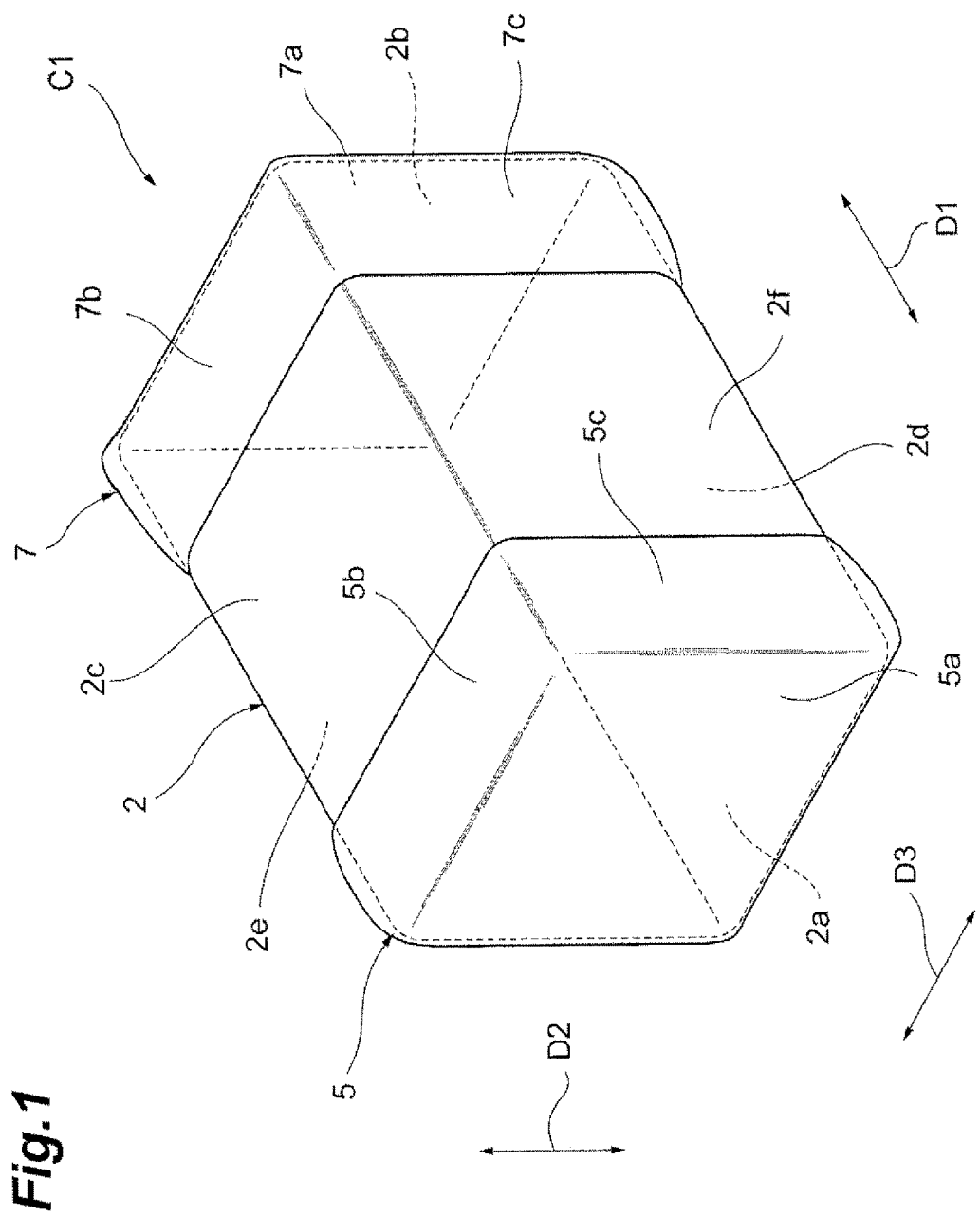
FIG. 1 is a perspective view illustrating a multilayer capacitor according to an embodiment.
Figure 2:
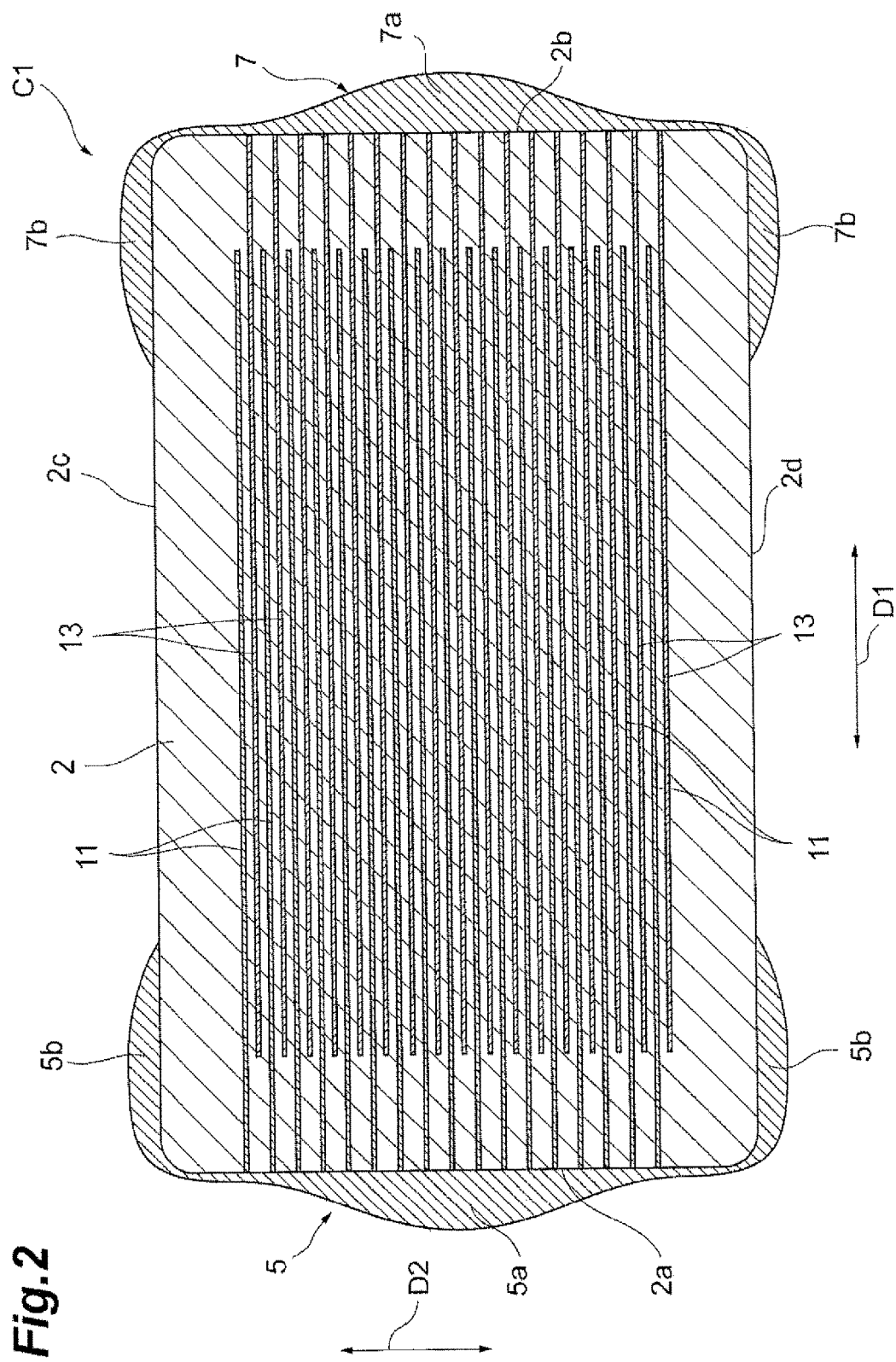
FIG. 2 is a view for explaining a sectional configuration of the multilayer capacitor according to the embodiment.
Figure 3:
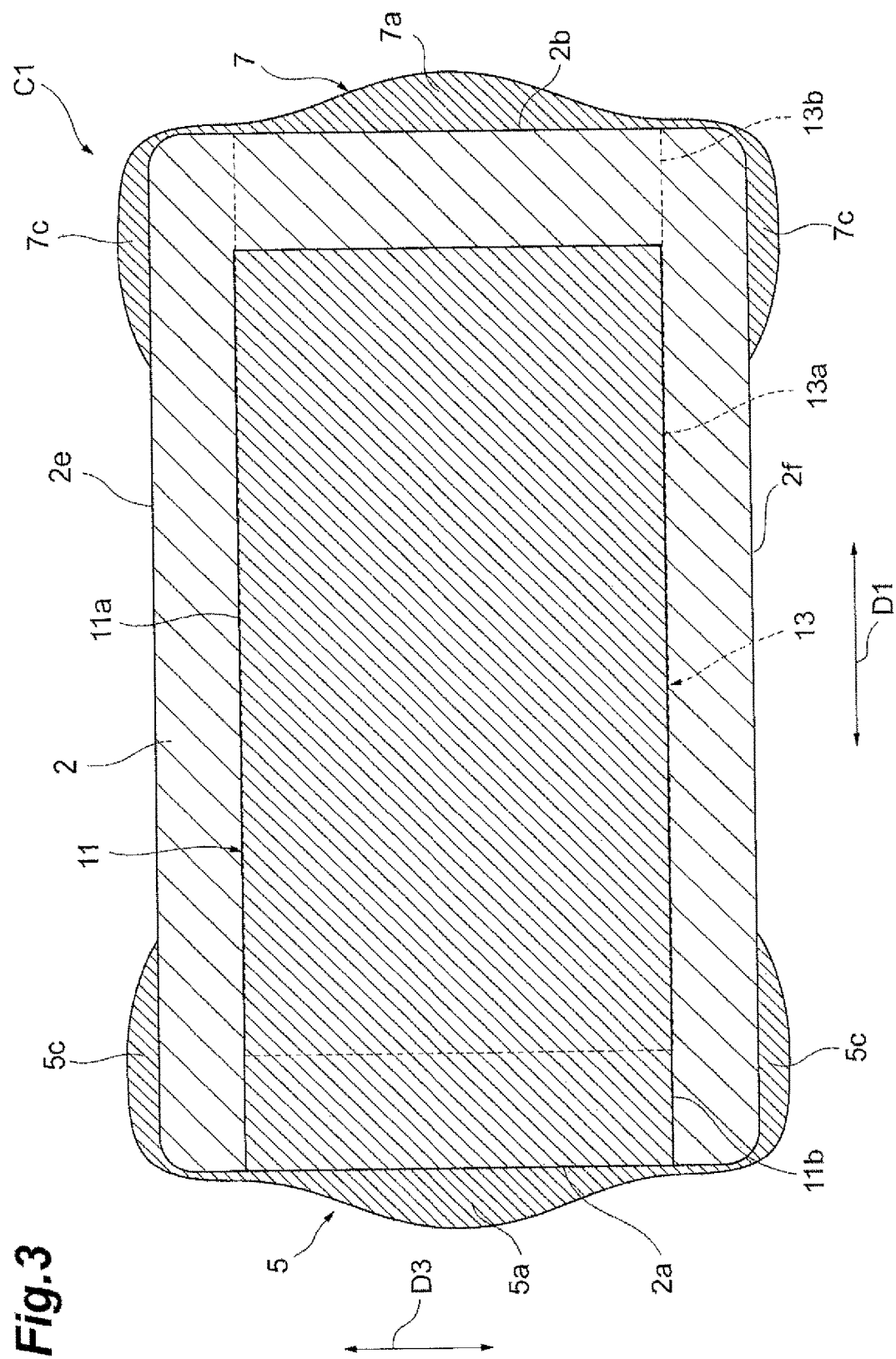
FIG. 3 is a view for explaining a sectional configuration of the multilayer capacitor according to the embodiment.
Figure 4:
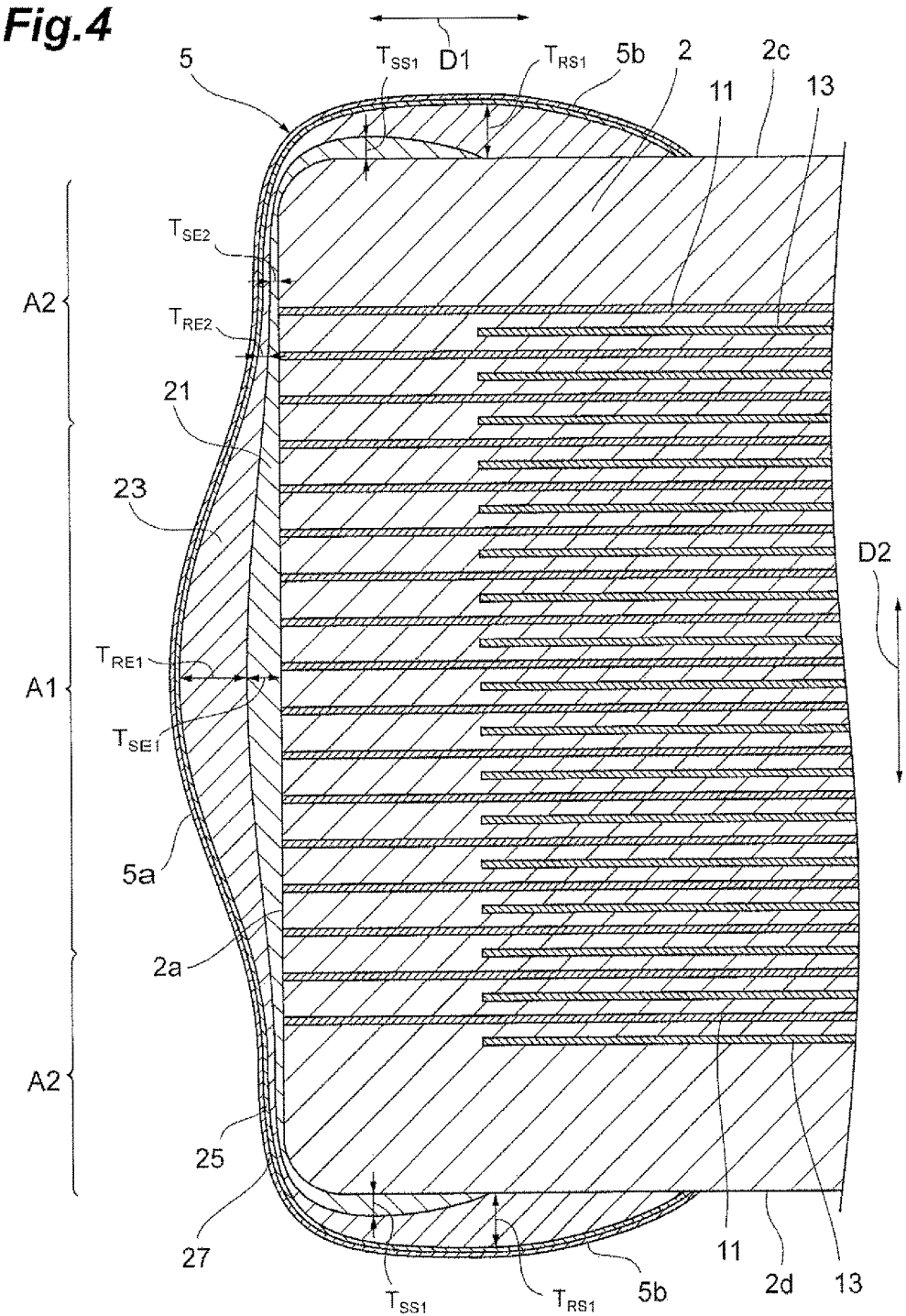
FIG. 4 is a view for explaining a sectional configuration of an external electrode.
Figure 5:
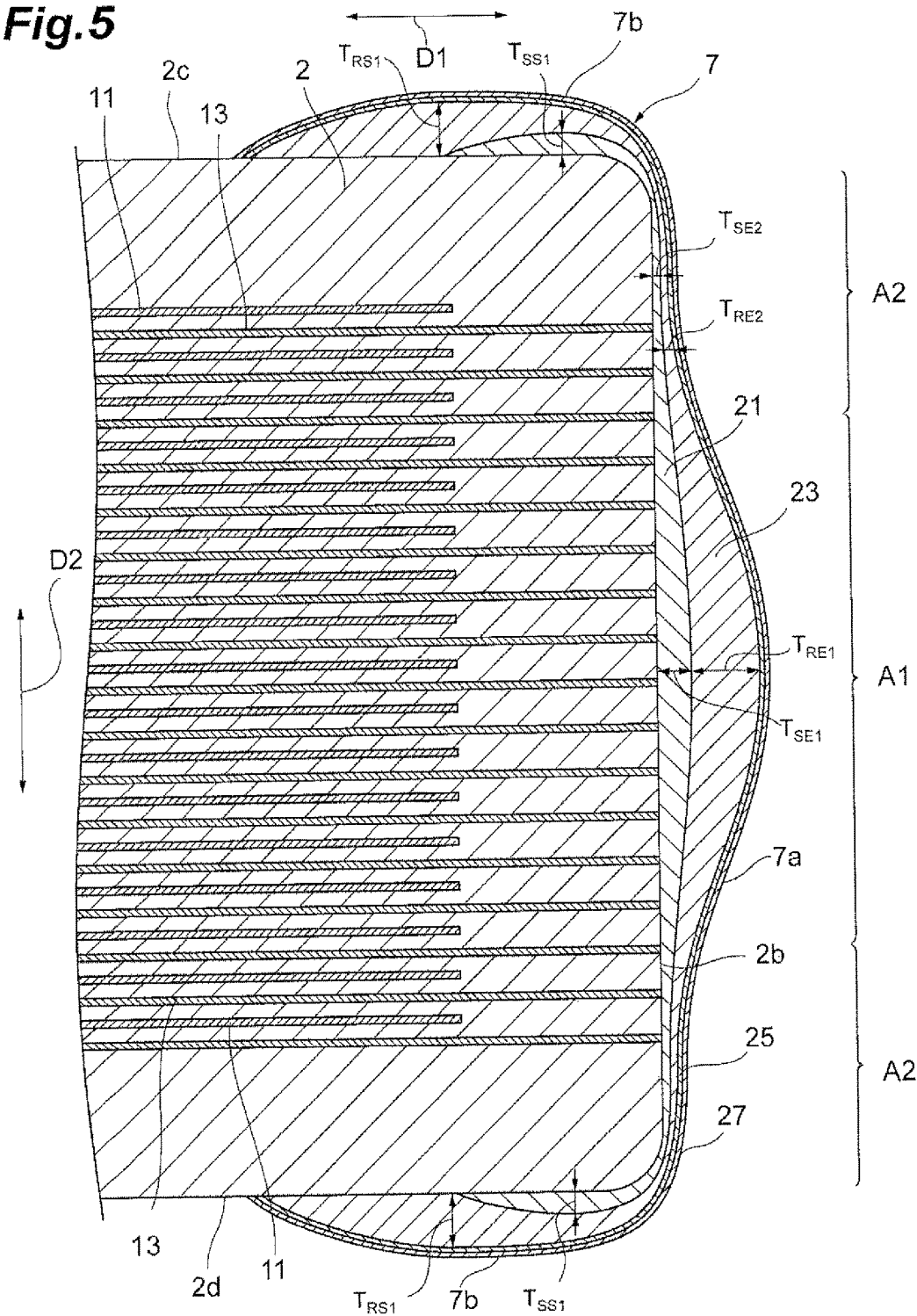
FIG. 5 is a view for explaining a sectional configuration of the external electrode.
Figure 6:
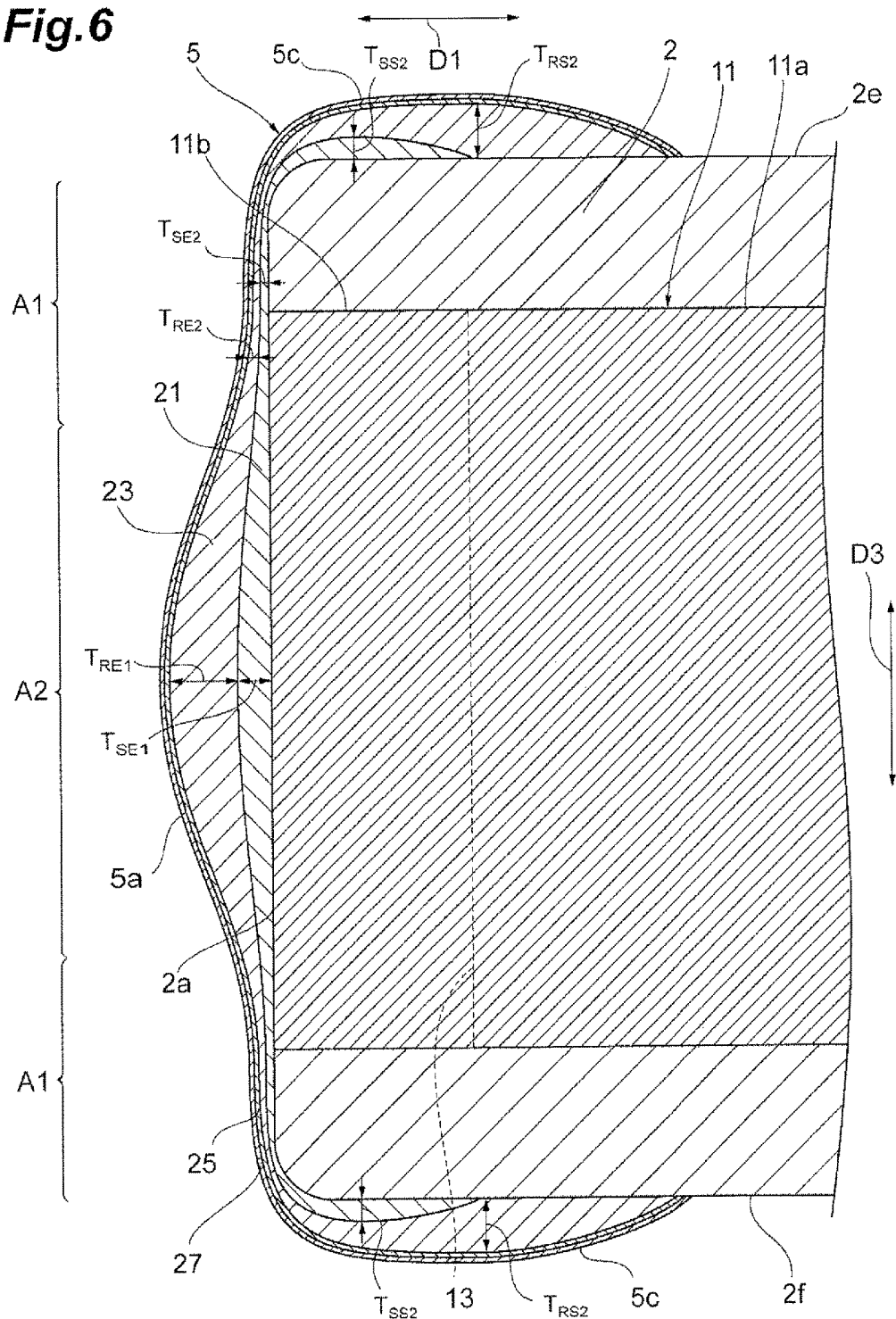
FIG. 6 is a view for explaining a sectional configuration of the external electrode.
Figure 7:
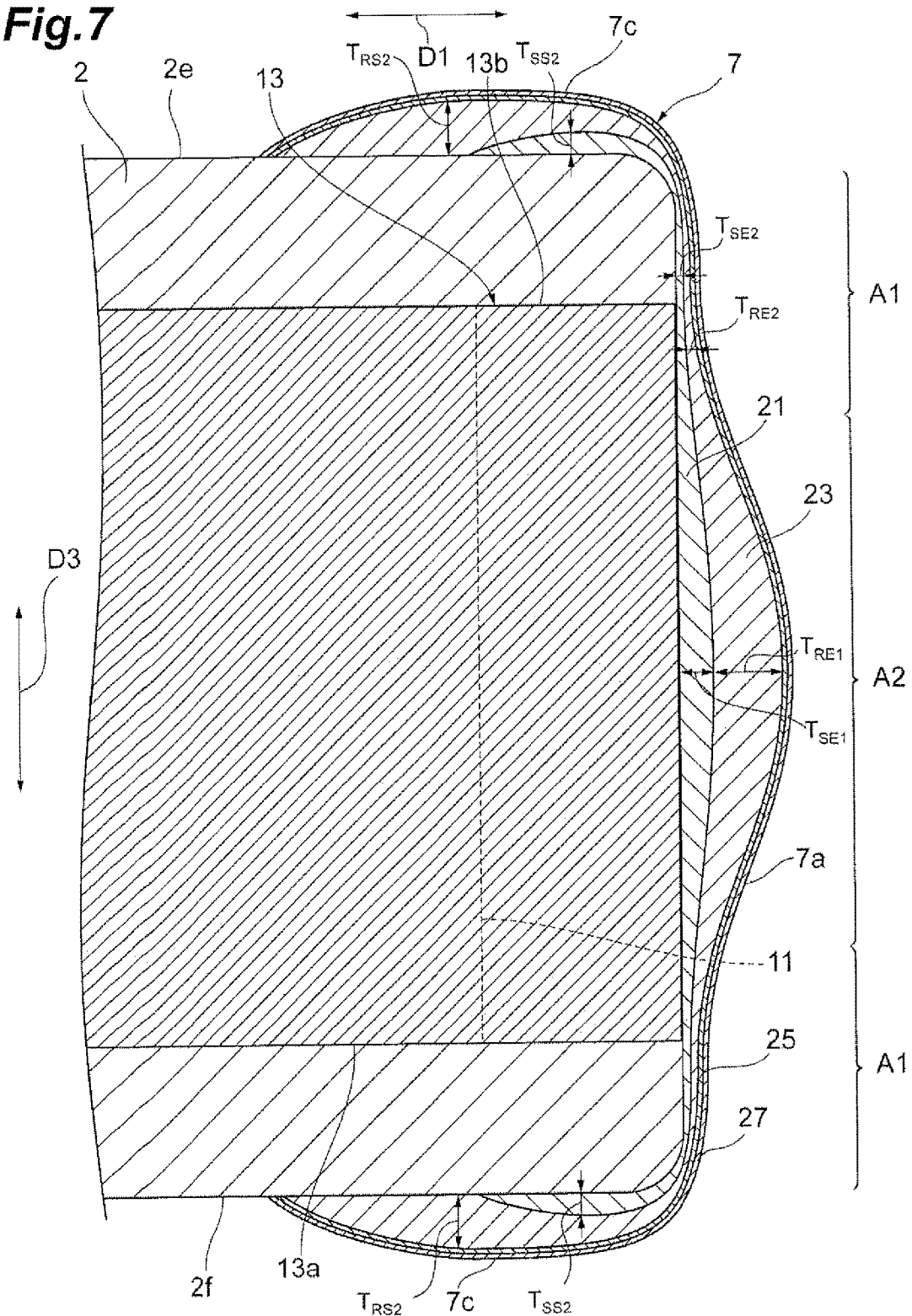
FIG. 7 is a view for explaining a sectional configuration of the external electrode.

With reference to FIGS. 1 and 2, a configuration of a multilayer capacitor C1 according to the embodiment will be described. FIG. 1 is a perspective view illustrating the multilayer capacitor according to the embodiment. FIGS. 2 and 3 are views for explaining sectional configurations of the multilayer capacitor according to the embodiment. In the embodiment, a description will be given using the multilayer capacitor C1 as an example of an electronic component.

As illustrated in FIG. 1, the multilayer capacitor C1 includes an element body 2 and external electrodes 5 and 7. The element body 2 has a rectangular parallelepiped shape. The external electrodes 5 and 7 are disposed on an outer surface of the element body 2. The external electrodes 5 and 7 are separated from each other. The rectangular parallelepiped shape includes a shape of a rectangular parallelepiped in which corner portions and ridge portions are chamfered, and a shape of a rectangular parallelepiped in which corner portions and ridge portions are rounded. The external electrodes 5, 7 are also terminal electrodes.

The element body 2 includes, as the outer surface thereof, a pair of end surfaces 2a, 2b opposing each other, a pair of first side surfaces 2c, 2d opposing each other, and a pair of second side surfaces 2e, 2f opposing each other. In the embodiment, a direction (first direction D1) in which the pair of end surfaces 2a, 2b oppose each other is a longitudinal direction of the element body 2, a direction (second direction D2) in which the pair of first side surfaces 2c, 2d oppose each other is a height direction of the element body 2, and a direction (third direction D3) in which the pair of second side surfaces 2e, 2f oppose each other is a width direction of the element body 2.

The length of the element body 2 in the first direction D1 is greater than the length of the element body 2 in the second direction D2 and the length of the element body 2 in the third direction D3. The length of the element body 2 in the second direction D2 and the length of the element body 2 in the third direction D3 are equivalent to each other. In the embodiment, the pair of end surfaces 2a, 2b has a square shape, and the pair of first side surfaces 2c, 2d and the pair of second side surfaces 2e, 2f has a rectangular shape. The length of the element body 2 in the first direction D1 may be equivalent to the length of the element body 2 in the second direction D2 and the length of the element body 2 in the third direction D3. The length of the element body 2 in the second direction D2 and the length of the element body 2 in the third direction D3 may be different from each other. The pair of end surfaces 2a, 2b has a rectangular shape.

"Equivalent" does not necessarily mean only that values are exactly equal to each other. Even in a case in which a slight difference within a predetermined range or a manufacturing error is included in the values, the values may be regarded as being equivalent to each other. For example, in a case in which a plurality of values is included within a range of ±5% from an average value of the plurality of values, the plurality of values may be defined to be equivalent to each other.

The pair of first side surfaces 2c, 2d extends in the first direction D1 to couple the pair of end surfaces 2a, 2b. The pair of first side surfaces 2c, 2d extends also in the third direction D3. The pair of second side surfaces 2e, 2f extends in the first direction D1 to couple the pair of end surfaces 2a, 2b. The pair of second side surfaces 2e, 2f extends also in the second direction D2.

The element body 2 is configured by laminating a plurality of dielectric layers in the direction (second direction D2) in which the pair of first side surfaces 2c, 2d oppose each other. In the element body 2, the lamination direction of the plurality of dielectric layers (hereinafter, simply referred to as "lamination direction") coincides with the second direction D2. Each of the dielectric layers is configured by a sintered body of a ceramic green sheet including, for example, a dielectric material (dielectric ceramic such as $BaTiO_3$-based, $Ba(Ti,Zr)O_3$-based, or $(Ba,Ca)TiO_3$-based dielectric ceramic). In the actual element body 2, the dielectric layers are integrated so that the boundary is not visible between the dielectric layers. The third direction D3 may be the lamination direction.

As illustrated in FIGS. 2 and 3, the multilayer capacitor C1 includes a plurality of internal electrodes 11 and a plurality of internal electrodes 13. The internal electrodes 11, 13 include a conductive material (such as Ni or Cu) generally used as an internal conductor of a multilayer electronic component. The internal electrodes 11, 13 are configured as a sintered body of a conductive paste. The conductive paste includes the conductive material. The internal electrodes 11, 13 are internal conductors disposed in the element body 2.

The internal electrodes 11 and the internal electrodes 13 are disposed in different positions (layers) in the second direction D2. The internal electrodes 11 and the internal electrodes 13 are alternately disposed in the element body 2 to oppose each other with intervals in the second direction D2. The internal electrodes 11 and the internal electrodes 13 have polarities different from each other.

As illustrated in FIG. 3, each of the internal electrodes 11 includes a main electrode portion 11a and a connection portion 11b. The connection portion 11b extends from one side (one short side) of the main electrode portion 11a, and is exposed to the end surface 2a. The internal electrodes 11 are exposed to the end surface 2a, and are not exposed to the end surface 2b, the pair of the first side surfaces 2c, 2d, and the pair of the second side surfaces 2e, 2f. The main electrode portion 11a and the connection portion 11b are integrally formed.

The main electrode portion 11a has a rectangular shape in which the first direction D1 is a long-side direction and the third direction D3 is a short-side direction. In the main electrode portion 11a of each internal electrode 11, the length in the first direction D1 is greater than that in the third direction D3. The connection portion 11b extends to the end surface 2a from the end portion of the main electrode portion 11a on the side of the end surface 2a. The length of the connection portion 11b in the first direction D1 is shorter than that of the main electrode portion 11a in the first direction D1. The length of the connection portion 11b in the third direction D3 is equivalent to that of the main electrode portion 11a in the third direction D3. The connection portion 11b is connected to the external electrode 5 at an end portion exposed to the end surface 2a. Each of the internal electrodes 11 includes an end portion exposed to the end surface 2a. The length of the connection portion 11b in the third direction D3 may be shorter than that of the main electrode portion 11a in the third direction D3.

As illustrated in FIG. 3, each of the internal electrodes 13 includes a main electrode portion 13a and a connection portion 13b. The main electrode portion 13a opposes the main electrode portion 11a in the second direction D2 through a part (dielectric layer) of the element body 2. The connection portion 13b extends from one side (one short side) of the main electrode portion 13a, and is exposed to the end surface 2b. The internal electrodes 13 are exposed to the end surface 2b, and are not exposed to the end surface 2a, the pair of the first side surfaces 2c, 2d, and the pair of the second side surfaces 2e, 2f. The main electrode portion 13a and the connection portion 13b are integrally formed.

The main electrode portion 13a has a rectangular shape in which the first direction D1 is a long-side direction and the third direction D3 is a short-side direction. Regarding the main electrode portion 13a of each internal electrode 13, the length thereof in the first direction D1 is greater than that in the third direction D3. The connection portion 13b extends to the end surface 2b from the end portion of the main electrode portion 13a on the side of the end surface 2b. The length of the connection portion 13b in the first direction D1 is shorter than that of the main electrode portion 13a in the first direction D1. The length of the connection portion 13b in the third direction D3 is equivalent to that of the main electrode portion 13a in the third direction D3. The connection portion 13b is connected to the external electrode 7 at an end portion exposed to the end surface 2b. Each of the internal electrodes 13 includes an end portion exposed to the end surface 2b. The length of the connection portion 13b in the third direction D3 may be shorter than that of the main electrode portion 13a in the third direction D3.

When viewed in the first direction D1, the external electrode 5 is located at the end portion of the element body 2 on the side of the end surface 2a. The external electrode 5 includes electrode portions 5a, 5b, and 5c. The electrode portion 5a is located on the end surface 2a, the electrode portion 5b is located on each of the first side surfaces 2c, 2d, and the electrode portion 5c is located on each of the second side surfaces 2e, 2f. In other words, the external electrode 5 is formed on five surfaces 2a, 2c, 2d, 2e, 2f.

The electrode portions 5a, 5b, 5c adjacent to one another are connected at ridge portions of the element body 2, and electrically connected. The electrode portion 5a and the electrode portions 5b are connected at the ridge portions between the end surface 2a and respective first side surfaces 2c, 2d. The electrode portion 5a and the electrode portions 5c are connected at the ridge portions between the end surface 2a and respective second side surfaces 2e, 2f.

The electrode portion 5a entirely covers the end portion of each connection portion 11b exposed to the end surface 2a. The connection portion 11b is directly connected to the external electrode 5. The connection portion 11b connects the main electrode portion 11a and the electrode portion 5a. Each of the internal electrodes 11 is electrically connected to the external electrode 5.

When viewed in the first direction D1, the external electrode 7 is located at the end portion of the element body 2 on the side of the end surface 2b. The external electrode 7 includes electrode portions 7a, 7b, and 7c. The electrode portion 7a is located on the end surface 2b, the electrode portion 7b is located on each of the first side surfaces 2c, 2d, and the electrode portion 7c is located on each of the second side surfaces 2e, 2f. In other words, the external electrode 7 is formed on five surfaces 2b, 2c, 2d, 2e, 2f.

The electrode portions 7a, 7b, 7c adjacent to one another are connected at ridge portions of the element body 2, and electrically connected. The electrode portion 7a and the electrode portions 7b are connected at the ridge portions between the end surface 2b and respective first side surfaces 2c, 2d. The electrode portion 7a and the electrode portions 7c are connected at the ridge portions between the end surface 2b and respective second side surfaces 2e, 2f.

The electrode portion 7a entirely covers the end portion of each connection portion 13b exposed to the end surface 2b. The connection portion 13b is directly connected to the external electrode 7. The connection portion 13b connects the main electrode portion 13a and the electrode portion 7a. Each of the internal electrodes 13 is electrically connected to the external electrode 7.

As illustrated in FIGS. 4 to 7, the external electrodes 5, 7 include a first electrode layer 21, a second electrode layer 23, a third electrode layer 25, and a fourth electrode layer 27, respectively. The electrode portions 5a, 5b, 5c include the first electrode layer 21, the second electrode layer 23, the third electrode layer 25, and the fourth electrode layer 27, respectively. The electrode portions 7a, 7b, 7c include the first electrode layer 21, the second electrode layer 23, the third electrode layer 25, and the fourth electrode layer 27, respectively. The fourth electrode layer 27 is an outermost layer of each of the external electrodes 5, 7.

The first electrode layer 21 is formed by sintering a conductive paste applied to the surface of the element body 2. The first electrode layer 21 is a layer formed by sintering a metal component (metal powder) included in the conductive paste. The first electrode layer 21 is a sintered metal layer disposed on the element body 2. In the embodiment, the first electrode layer 21 is a sintered metal layer including Cu. The first electrode layer 21 may be a sintered metal layer including Ni. As described above, the first electrode layer 21 includes base metals (such as Cu or Ni). Powder including base metals, a glass component, an organic binder, and an organic solvent are mixed in the conductive paste.

The second electrode layer 23 is formed by curing a conductive resin applied onto the first electrode layer 21. The second electrode layer 23 is a conductive resin layer disposed on the first electrode layer 21. The conductive resin is a mixture of a thermosetting resin, metal powder, and an organic solvent. As the metal powder, for example, Ag powder or Cu powder is used. As the thermosetting resin, for example, a phenolic resin, an acrylic resin, a silicone resin, an epoxy resin, or a polyimide resin is used.

The third electrode layer 25 is formed on the second electrode layer 23 by a plating method. In the embodiment, the third electrode layer 25 is a Ni plating layer disposed on the second electrode layer 23. The third electrode layer 25 may be a Sn plating layer, a Cu plating layer, or an Au plating layer. As described above, the third electrode layer 25 includes Ni, Sn, Cu, or Au.

The fourth electrode layer 27 is formed on the third electrode layer 25 by a plating method. In the embodiment, the fourth electrode layer 27 is a Sn plating layer disposed on the third electrode layer 25. The fourth electrode layer 27 may be a Cu plating layer, or an Au plating layer. As described above, the fourth electrode layer 27 includes Sn, Cu, or Au. The third and fourth electrode layers 25, 27 are plating layers formed on the second electrode layer 23.

Next, with reference to FIGS. 4 to 7, the thicknesses of the first electrode layer 21 and the second electrode layer 23 of the external electrodes 5, 7 will be described.

A thickness $T_{RE1}$ of the second electrode layer 23 located on the central region A1 of each of the end surfaces 2a, 2b is greater than a thickness $T_{RE2}$ of the second electrode layer 23 located on the peripheral region A2 of each of the end surfaces 2a, 2b. A thickness $T_{RS1}$ of the second electrode layer 23 located on each of the first side surfaces 2c, 2d and a thickness $T_{RS2}$ of the second electrode layer 23 located on each of the second side surfaces 2e, 2f are greater than the thickness $T_{RE2}$ of the second electrode layer 23. The thickness $T_{RS1}$ and the thickness $T_{RS2}$ of the second electrode layer 23 are less than the thickness $T_{RE1}$ of the second electrode layer 23. In the embodiment, the thickness $T_{RS1}$ of the second electrode layer 23 and the thickness $T_{RS2}$ of the second electrode layer 23 are equivalent to each other.

A thickness $T_{SS1}$ of the first electrode layer 21 located on each of the first side surfaces 2c, 2d and a thickness $T_{SS2}$ of the first electrode layer 21 located on each of the second side surfaces 2e, 2f are less than a thickness $T_{SE1}$ of the first electrode layer 21 located on the central region A1 of each of the end surfaces 2a, 2b, and greater than a thickness $T_{SE2}$ of the first electrode layer 21 located on the peripheral region A2 of each of the end surfaces 2a, 2b. The thickness $T_{RS1}$ and the thickness $T_{RS2}$ of the second electrode layer 23 are greater than the thickness $T_{SS1}$ and the thickness $T_{SS2}$ of the first electrode layer 21. The thickness $T_{RE1}$ of the second electrode layer 23 is greater than the thickness $T_{SE1}$ of the first electrode layer 21. In the embodiment, the thickness $T_{SS1}$ of the first electrode layer 21 and the thickness $T_{SS2}$ of the first electrode layer 21 are equivalent to each other.

Figure 8:
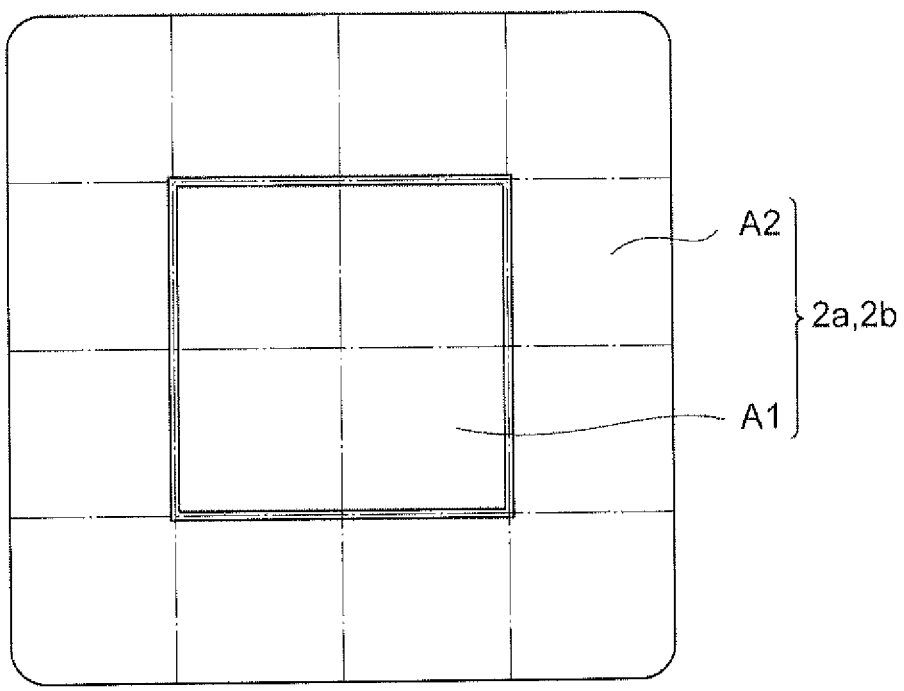
FIG. 8 is a plan view illustrating an end surface.
Figure 9:
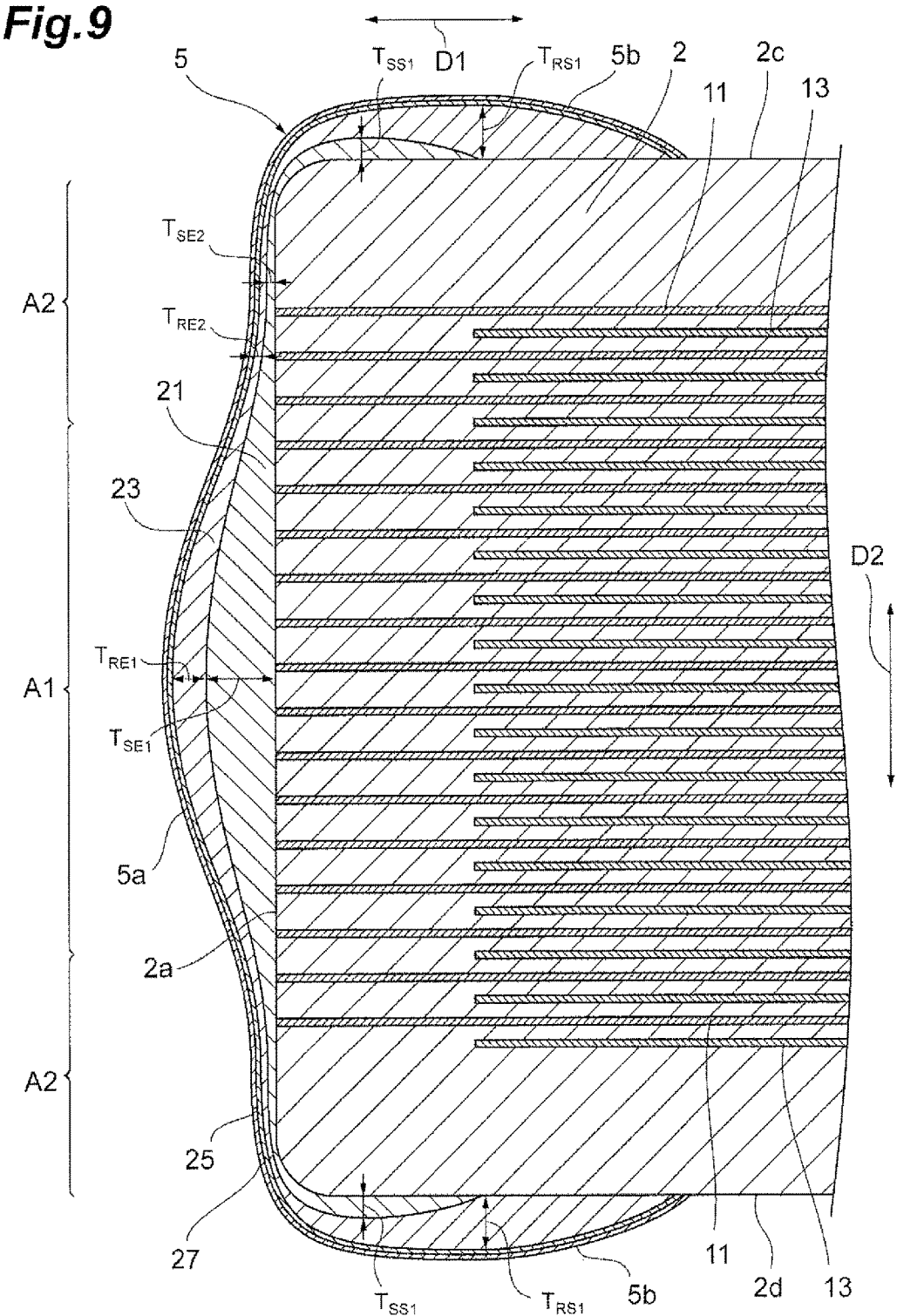
FIG. 9 is a view for explaining a sectional configuration of an external electrode according to a variation.
Figure 10:
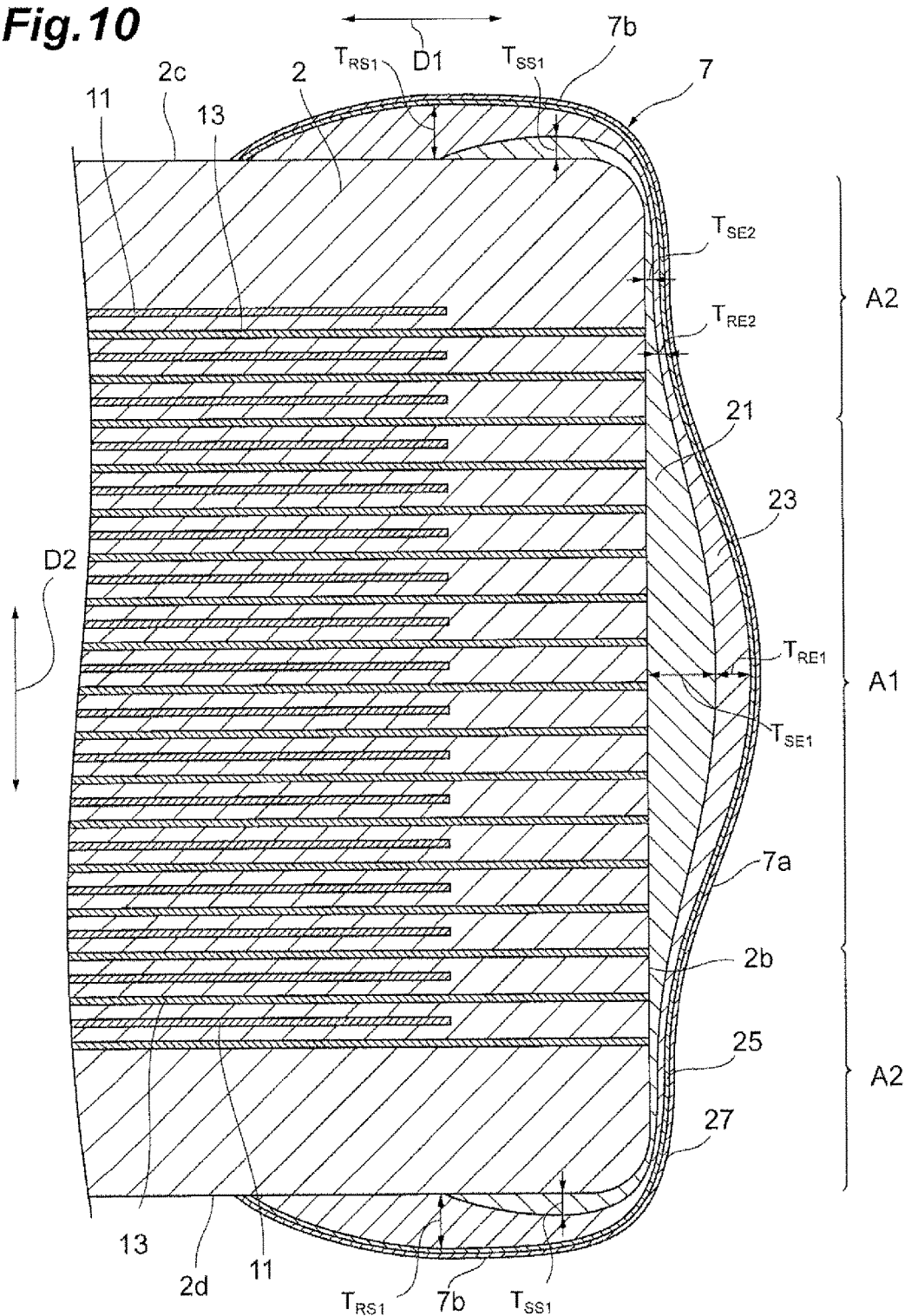
FIG. 10 is a view for explaining a sectional configuration of the external electrode according to the variation.
Figure 11:
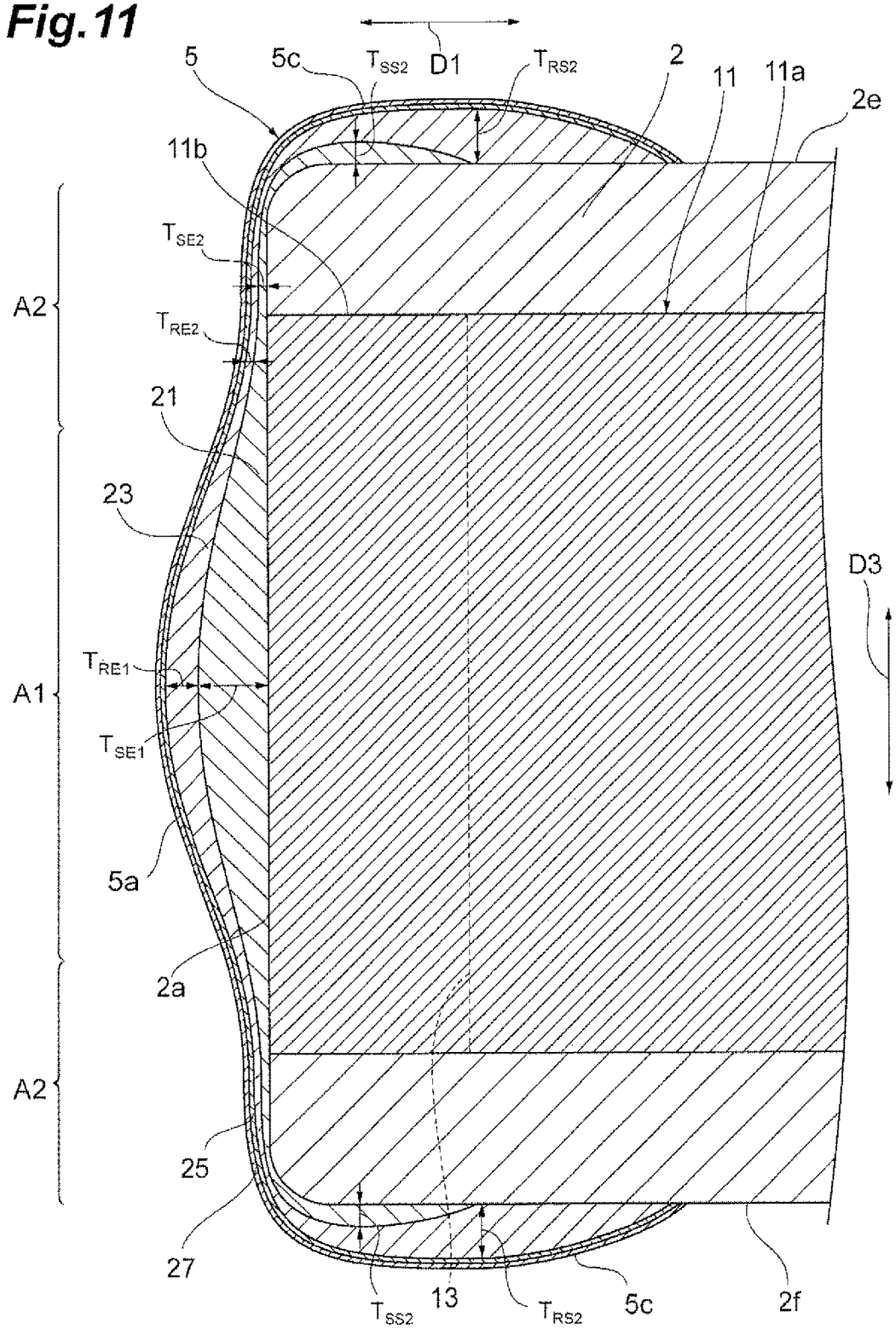
FIG. 11 is a view for explaining a sectional configuration of the external electrode according to the variation.
Figure 12:
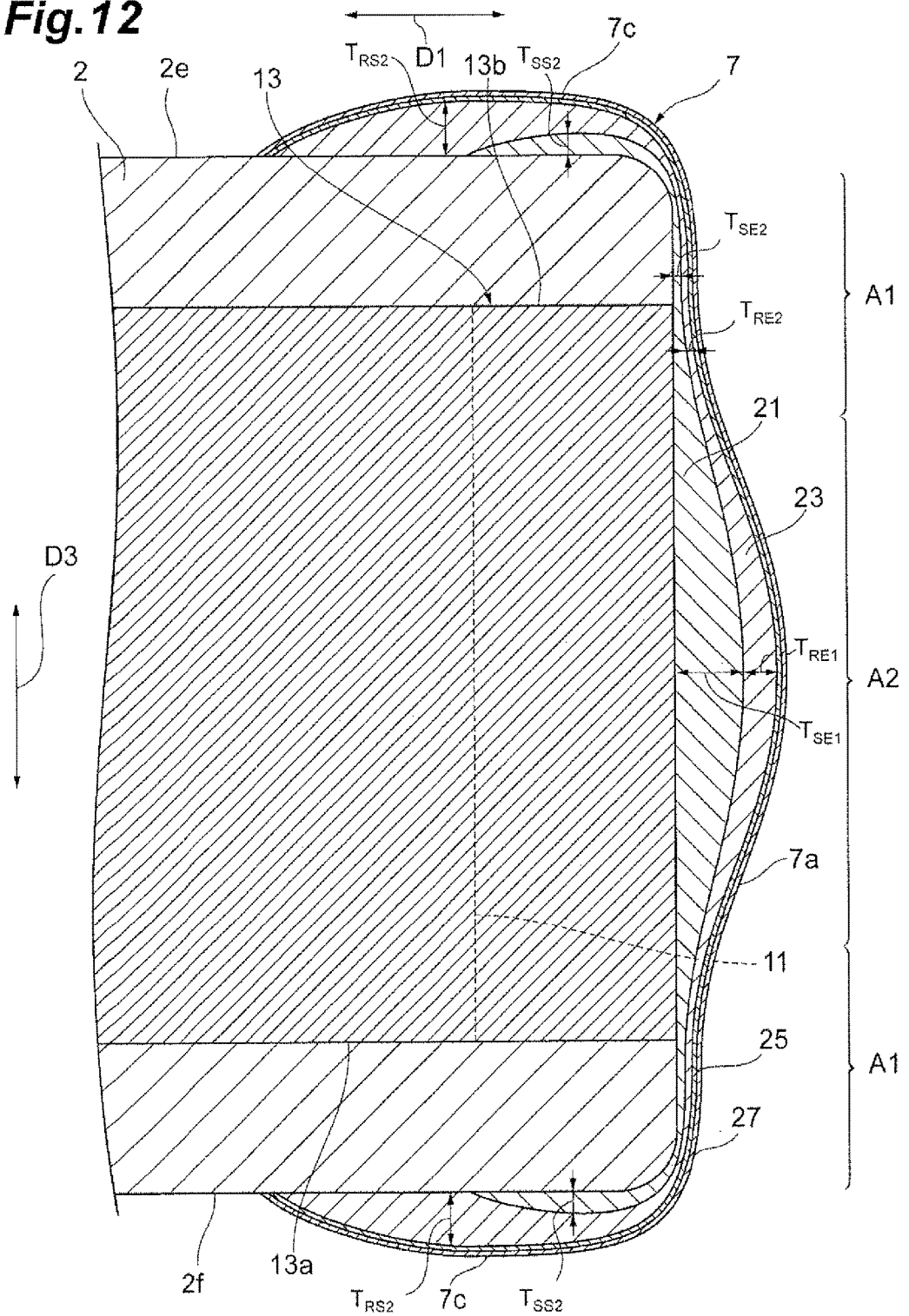
FIG. 12 is a view for explaining a sectional configuration of the external electrode according to the variation.

The central region A1 and the peripheral region A2 of each of the end surfaces 2a, 2b are defined, for example, as follows. As illustrated in FIG. 8, each of the end surfaces 2a, 2b is divided into 16 equal sections. Among the 16 sections, four sections located inside are defined as the central region A1. Among the 16 sections, 12 sections located outside are defined as the peripheral region A2.

Here, the thickness means an average thickness. The thickness $T_{RE1}$ is an average thickness of the portion of the second electrode layer 23 located on the central region A1. The thickness $T_{RE1}$ is, for example, 10 to 80 µm. The thickness $T_{RE2}$ is an average thickness of the portion of the second electrode layer 23 located on the peripheral region A2. The thickness $T_{RE2}$ is, for example, 1 to 10 µm. The thickness $T_{RS1}$ is an average thickness of the portions of the second electrode layer 23 located on the corresponding side surfaces 2c, 2d. The thickness $T_{RS2}$ is an average thickness of the portions of the second electrode layer 23 located on the corresponding side surfaces 2e, 2f. The thickness $T_{RS1}$ and the thickness $T_{RS2}$ are, for example, 10 to 60 µm.

The thickness $T_{SE1}$ is an average thickness of the portion of the first electrode layer 21 located on the central region A1. The thickness $T_{SE1}$ is, for example, 10 to 100 µm. The thickness $T_{SE2}$ is an average thickness of the portion of the first electrode layer 21 located on the peripheral region A2. The thickness $T_{SE2}$ is, for example, 1 to 10 µm. The thickness $T_{SS1}$ is an average thickness of the portions of the first electrode layer 21 located on the corresponding side surfaces 2c, 2d. The thickness $T_{SS2}$ is an average thickness of the portions of the first electrode layer 21 located on the corresponding side surfaces 2e, 2f. The thickness $T_{SS1}$ and the thickness $T_{SS2}$ are, for example, 5 to 30 µm.

For example, the average thickness can be obtained as follows.

A sectional view is obtained which includes a portion of each of the first and second electrode layers 21, 23 located on the central region A1 and a portion of each of the first and second electrode layers 21, 23 located on the peripheral region A2. This sectional view is, for example, a sectional view of the first and second electrode layers 21, 23 obtained when cutting the first and second electrode layers 21, 23 with a plane which is in parallel to a pair of side surfaces opposing each other (for example, a pair of the second side surfaces 2e, 2f), and located in an equal distance from the pair of side surfaces. Areas of respective portions on the obtained sectional view are calculated, which respective portions are a portion of the first electrode layer 21 located on the central region A1, a portion of the second electrode layer 23 located on the central region A1, a portion of the first electrode layer 21 located on the peripheral region A2, and a portion of the second electrode layer 23 located on the peripheral region A2.

The average thickness of the portion of the first electrode layer 21 located on the central region A1 is a quotient obtained by dividing the area of the portion of the first electrode layer 21 located on the central region A1 by the length of the central region A1 on the obtained sectional view. The average thickness of the portion of the second electrode layer 23 located on the central region A1 is a quotient obtained by dividing the area of the portion of the second electrode layer 23 located on the central region A1 by the length of the central region A1 on the obtained sectional view. The average thickness of the portion of the first electrode layer 21 located on the peripheral region A2 is a quotient obtained by dividing the area of the portion of the first electrode layer 21 located on the peripheral region A2 by the length of the peripheral region A2 on the obtained sectional view. The average thickness of the portion of the second electrode layer 23 located on the peripheral region A2 is a quotient obtained by dividing the area of the portion of the second electrode layer 23 located on the peripheral region A2 by the length of the peripheral region A2 on the obtained sectional view.

A sectional view is obtained which includes portions of the first and second electrode layers 21, 23 located on the corresponding side surfaces 2c, 2d. This sectional view is, for example, a sectional view of the first and second electrode layers 21, 23 obtained when cutting the first and second electrode layers 21, 23 with a plane which is in parallel to a pair of side surfaces opposing each other (for example, a pair of the second side surfaces 2e, 2f), and located in an equal distance from the pair of side surfaces. Areas of portions of the first electrode layer 21 located on the side surfaces 2c, 2d and portions of the second electrode layer 23 located on the side surfaces 2c, 2d on the obtained sectional view are calculated.

The average thickness of the portions of the first electrode layer 21 located on the side surfaces 2c, 2d is a quotient obtained by dividing the areas of the portions of the first electrode layer 21 located on the side surfaces 2c, 2d by the lengths of the portions located on the side surfaces 2c, 2d on the obtained sectional view. The average thickness of the portions of the second electrode layer 23 located on the side surfaces 2c, 2d is a quotient obtained by dividing the areas of the portions of the second electrode layer 23 located on the side surfaces 2c, 2d by the lengths of the portions located on the side surfaces 2c, 2d on the obtained sectional view.

A sectional view is obtained which includes portions of the first and second electrode layers 21, 23 located on the corresponding side surfaces 2e, 2f. This sectional view is, for example, a sectional view of the first and second electrode layers 21, 23 obtained when cutting the first and second electrode layers 21, 23 with a plane which is in parallel to a pair of side surfaces opposing each other (for example, a pair of the first side surfaces 2c, 2d), and located in an equal distance from the pair of side surfaces. Areas of portions of the first electrode layer 21 located on the side surfaces 2e, 2f and portions of the second electrode layer 23 located on the side surfaces 2e, 2f on the obtained sectional view are calculated.

The average thickness of the portions of the first electrode layer 21 located on the side surfaces 2e, 2f is a quotient obtained by dividing the areas of the portions of the first electrode layer 21 located on the side surfaces 2e, 2f by the lengths of the portions located on the side surfaces 2e, 2f on the obtained sectional view. The average thickness of the portions of the second electrode layer 23 located on the side surfaces 2e, 2f is a quotient obtained by dividing the areas of the portions of the second electrode layer 23 located on the side surfaces 2e, 2f by the lengths of the portions located on the side surfaces 2e, 2f on the obtained sectional view.

A plurality of sectional views may be obtained and each quotient described above may be obtained for each sectional view. In this case, an average value of the obtained quotients may be the average thickness.

Next, surface roughness of the first electrode layer 21 of each of the external electrodes 5, 7 will be described.

Surface roughness of the first electrode layer 21 located on the central region A1 of each of the end surfaces 2a, 2b is greater than surface roughness of the first electrode layer 21 located on the peripheral region A2 of each of the end surfaces 2a, 2b. Surface roughness of the first electrode layer 21 located on each of the first side surfaces 2c, 2d and surface roughness of the first electrode layer 21 located on each of the second side surfaces 2e, 2f are greater than the surface roughness of the first electrode layer 21 located on the peripheral region A2 of each of the end surfaces 2a, 2b.

Here, the surface roughness of the first electrode layer 21 means arithmetical mean roughness (Ra) of the first electrode layer 21. The arithmetical mean roughness (Ra) is defined in JIS B 0601:2013 (ISO 4287:1997).

The multilayer capacitor C1 is mounted by soldering to another electronic device (e.g., a circuit board, an electronic component, or the like). In the multilayer capacitor C1, one of the pair of first side surfaces 2c, 2d and the pair of second side surfaces 2e, 2f is a mounting surface opposing the other electronic device.

The stress by a solder fillet more strongly acts on a central electrode portion of each of the electrode portions 5a, 7a corresponding to the central region A1 of each of the end surfaces 2a, 2b, than on a peripheral electrode portion of each of electrode portions 5a, 7a corresponding to the peripheral region A2 of each of the end surfaces 2a, 2b. In other words, the stress acting on the central electrode portion of each of the electrode portions 5a, 7a is greater than the stress acting on the peripheral electrode portion of each of the electrode portions 5a, 7a. When the second electrode layer 23 has a thickness with which the stress acting on the central electrode portion of each of the electrode portions 5a, 7a can be sufficiently relaxed, the stress by a solder fillet is sufficiently relaxed.

Since the thickness $T_{RE1}$ of the second electrode layer 23 is greater than the thickness $T_{RE2}$ of the second electrode layer 23 in the multilayer capacitor C1 as described above, the stress by a solder fillet is sufficiently relaxed.

The stress acting on the peripheral electrode portion of each of the electrode portions 5a, 7a is less than the stress acting on the central electrode portion of each of the electrode portions 5a, 7a. Therefore, it is possible to make the thickness $T_{RE2}$ of the second electrode layer 23 less than the thickness $T_{RE1}$ of the second electrode layer 23 in a manner corresponding to the peripheral electrode portion of each of the electrode portions 5a, 7a of which the stress acting thereon is less than that of the central electrode portion of each of the electrode portions 5a, 7a. In this case, the thickness $T_{RE2}$ of the second electrode layer 23 is made to be less than the thickness $T_{RE1}$ of the second electrode layer 23, and thus an amount of the conductive resin used can be reduced accordingly.

As described above, the thickness $T_{RE2}$ of the second electrode layer 23 is less than the thickness $T_{RE1}$ of the second electrode layer 23 in the multilayer capacitor C1. Consequently, the amount of the conductive resin used can be reduced in the multilayer capacitor C1, in comparison with, for example, a multilayer capacitor in which the thickness of the second electrode layer 23 is the thickness $T_{RE1}$ throughout the second electrode layer 23.

When the multilayer capacitor C1 is mounted by soldering on an electronic device in a state where the one side surface opposes the electronic device, stress from the electronic device may act also on the electrode portions 5b, 5c, 7b, 7c. For example, when the multilayer capacitor C1 is mounted by soldering on a circuit board, deflection stress acts also on the electrode portions 5b, 5c, 7b, 7c in accordance with deflection of the circuit board.

In the multilayer capacitor C1, the thickness $T_{RS1}$ and the thickness $T_{RS2}$ of the second electrode layer 23 are greater than the thickness $T_{RE2}$ of the second electrode layer 23. As a result, the stress acting on the electrode portions 5b, 5c, 7b, 7c is relaxed in the multilayer capacitor C1, in comparison with, for example, a multilayer capacitor in which the thickness $T_{RS1}$ and the thickness $T_{RS2}$ are less than or equal to the thickness $T_{RE2}$.

In the multilayer capacitor C1, the thickness $T_{RS1}$ and the thickness $T_{RS2}$ of the second electrode layer 23 are less than the thickness $T_{RE1}$ of the second electrode layer 23. As a result, the amount of the conductive resin used can be reduced in the multilayer capacitor C1, in comparison with, for example, a multilayer capacitor in which the thickness of the second electrode layer 23 is the thickness $T_{RE1}$ throughout the second electrode layer 23.

The external electrodes 5, 7 each include the first electrode layer 21 formed on the element body 2, and the second electrode layer 23 is formed on the first electrode layer 21. As a result, the fixing strength between the element body 2 and each of the external electrodes 5, 7 is improved in the multilayer capacitor C1.

The thickness $T_{SS1}$ and the thickness $T_{SS2}$ of the first electrode layer 21 are less than the thickness $T_{SE1}$ of the first electrode layer 21 and greater than the thickness $T_{SE2}$ of the first electrode layer 21. In this case, since the thickness $T_{SE1}$ is greater than the thickness $T_{SS1}$, the thickness $T_{SS2}$, and the thickness $T_{SE2}$, fixing strength between the element body 2 and the first electrode layer 21 is improved in a region on which the stress by a solder fillet strongly acts. Since the thickness $T_{SS1}$ and the thickness $T_{SS2}$ of the first electrode layer 21 are greater than the thickness $T_{SE2}$ of the first electrode layer 21, the fixing strength between the element body 2 and the first electrode layer 21 is improved in a region on which the stress from the electronic device acts. As a result, the fixing strength between the element body 2 and each of the external electrodes 5, 7 is further improved.

Surface roughness of the first electrode layer 21 located on the central region A1 of each of the end surfaces 2a, 2b is greater than surface roughness of the first electrode layer 21 located on the peripheral region A2 of each of the end surfaces 2a, 2b. As a result, in the multilayer capacitor C1, fixing strength between the first electrode layer 21 and the second electrode layer 23 is improved in a region on which the stress by a solder fillet strongly acts.

Surface roughness of the first electrode layer 21 located on each of the first side surfaces 2c, 2d and surface roughness of the first electrode layer 21 located on each of the second side surfaces 2e, 2f are greater than the surface roughness of the first electrode layer 21 located on the peripheral region A2 of each of the end surfaces 2a, 2b. As a result, in the multilayer capacitor C1, the fixing strength between the first electrode layer 21 and the second electrode layer 23 is improved in a region on which the stress from the electronic device acts.

The thickness $T_{RS1}$ and the thickness $T_{RS2}$ of the second electrode layer 23 are greater than the thickness $T_{SS1}$ and the thickness $T_{SS2}$ of the first electrode layer 21. As a result, the stress acting on the electrode portions 5b, 5e, 7b, 7c is relaxed in the multilayer capacitor C1, in comparison with, for example, a multilayer capacitor in which the thickness $T_{RS1}$ and the thickness $T_{RS2}$ are less than or equal to the thickness $T_{SS1}$ and the thickness $T_{SS2}$.

The external electrodes 5, 7 each include the third and fourth electrode layers 25, 27 located on the second electrode layer 23. As a result, the multilayer capacitor C1 is securely mounted by soldering on the electronic device.

Next, with reference to FIGS. 9 to 12, a configuration of a multilayer capacitor C1 according to a variation of the embodiment will be described. FIGS. 9 to 12 are views for explaining a sectional configuration of an external electrode according to the variation. The variation differs from the above-described embodiment in terms of the thicknesses of a first electrode layer 21 and a second electrode layer 23 of each of external electrodes 5, 7.

Also in the variation, the multilayer capacitor C1 includes an element body 2, the external electrode 5, and the external electrode 7. The external electrode 5 includes an electrode portion 5a, an electrode portion 5b, and an electrode portion 5c. The external electrode 7 includes an electrode portion 7a, an electrode portion 7b, and an electrode portion 7c. The external electrodes 5, 7 include the first electrode layer 21, the second electrode layer 23, a third electrode layer 25, and a fourth electrode layer 27, respectively.

In the variation, the thickness $T_{RS1}$ and the thickness $T_{RS2}$ of the second electrode layer 23 are greater than the thickness $T_{RE1}$ of the second electrode layer 23. As a result, the stress acting on the electrode portions 5b, 5c, 7b, 7c is relaxed in the multilayer capacitor C1 of the variation, in comparison with, for example, a multilayer capacitor in which the thickness $T_{RS1}$ and the thickness $T_{RS2}$ are less than or equal to the thickness $T_{RE1}$ of the second electrode layer 23.

In the variation, the thickness $T_{SE1}$ of the first electrode layer 21 is greater than the thickness $T_{RE1}$ of the second electrode layer 23. As a result, connectability between the internal electrodes 11, 13 and the first electrode layer 21 is secured in the multilayer capacitor C1 of the variation, in comparison with, for example, a multilayer capacitor in which the thickness $T_{SE1}$ is less than or equal to the thickness $T_{RE1}$.

The embodiment of the present invention has been described above. However, the present invention is not necessarily limited to the above-described embodiment, and may be variously changed without departing from the scope of the present invention.

The external electrodes 5, 7 each include the third and fourth electrode layers 25, 27 as a plating layer. In other words, the number of the plating layers included in each of the external electrodes 5, 7 is more than one. However, there is no limitation thereto. The number of the plating layers included in each of the external electrodes 5, 7 may be one.

The external electrode 5 is formed on five surfaces 2a, 2c, 2d, 2e, 2f, and the external electrode 7 is formed on five surfaces 2b, 2c, 2d, 2e, 2f. However, there is no limitation thereto. The external electrode 5 may be formed on two surfaces of the end surface 2a and one side surface as a mounting surface, or may be formed on the end surface 2a only. The external electrode 7 may be formed on two surfaces of the end surface 2b and one side surface as a mounting surface, or may be formed on the end surface 2b only.

In the embodiment and the variations, descriptions have been given using the multilayer capacitor C1 as an example of the electronic component. However, the application of the present invention is not limited to a multilayer capacitor. The present invention can be applied to a multilayer electronic component such as a multilayer inductor, a multilayer varistor, a multilayer piezoelectric actuator, a multilayer thermistor, or a multilayer composite component, or an electronic component other than the multilayer electronic component.

What is claimed is:

1. An electronic component comprising:
   an element body having a pair of end surfaces opposing each other and a side surface adjacent to the pair of end surfaces, and an external electrode disposed on at least one of the end surfaces,
   wherein the external electrode includes a conductive resin layer located on at least the end surface, and a first thickness of the conductive resin layer located on a central region of the end surface is greater than a second thickness of the conductive resin layer located on a peripheral region of the end surface; the peripheral region of the end surface not including a corner of the end surface.

2. The electronic component according to claim 1, wherein
   the external electrode is also disposed on the side surface,
   the conductive resin layer is also located on the side surface, and
   a third thickness of the conductive resin layer located on the side surface is greater than the second thickness.

3. The electronic component according to claim 1, wherein the external electrode is also disposed on the side surface, the conductive resin layer is also located on the side surface, and a third thickness of the conductive resin layer located on the side surface is less than the first thickness.

4. The electronic component according to claim 1, wherein
   the external electrode is also disposed on the side surface,
   the conductive resin layer is also located on the side surface, and
   a third thickness of the conductive resin layer located on the side surface is greater than the first thickness.

5. The electronic component according to claim 1, wherein
   the external electrode further includes a sintered metal layer disposed on the element body, and
   the conductive resin layer is disposed on the sintered metal layer.

6. The electronic component according to claim 5, wherein
   the sintered metal layer is disposed on at lease the end surface, and
   a fourth thickness of the sintered metal layer located on the central region of the end surface is greater than the first thickness.

7. The electronic component according to claim 1, wherein
   the external electrode further includes a sintered metal layer disposed on the end surface and the side surface,
   the conductive resin layer is disposed on the sintered metal layer and located on the end surface and the side surface, and
   a third thickness of the conductive resin layer located on the side surface is greater than a sixth thickness of the sintered metal layer located on the side surface.

8. The electronic component according to claim 1, wherein
   the external electrode further includes a plating layer disposed on the conductive resin layer.

9. An electronic component comprising:
   an element body having a pair of end surfaces opposing each other and a side surface adjacent to the pair of end surfaces, and
   an external electrode disposed on at least one of the end surfaces,
   wherein
   the external electrode includes a conductive resin layer located on at least the end surface,
   a first thickness of the conductive resin layer located on a central region of the end surface is greater than a second thickness of the conductive resin layer located on a peripheral region of the end surface,
   the external electrode further includes a sintered metal layer disposed on the element body,
   the conductive resin layer is disposed on the sintered metal layer, the sintered metal layer is disposed on the end surface and the side surface, and a sixth thickness of the sintered metal layer located on the side surface is less than a fourth thickness of the sintered metal layer located on the central region of the end surface, and greater than a fifth thickness of the sintered metal layer located on the peripheral region of the end surface.

10. An electronic component comprising:

an element body having a pair of end surfaces opposing each other and a side surface adjacent to the pair of end surfaces, and an external electrode disposed on at least one of the end surfaces, wherein the external electrode includes a conductive resin layer located on at least the end surface, a first thickness of the conductive resin layer located on a central region of the end surface is greater than a second thickness of the conductive resin layer located on a peripheral region of the end surface, the external electrode further includes a sintered metal layer disposed on the element body, the conductive resin layer is disposed on the sintered metal layer, the sintered metal layer is disposed on the end surface and the side surface, and surface roughness of the sintered metal layer located on the central region of the end surface is greater than surface roughness of the sintered metal layer located on the peripheral region of the end surface.

11. An electronic component comprising:

an element body having a pair of end surfaces opposing each other and a side surface adjacent to the pair of end surfaces, and an external electrode disposed on at least one of the end surfaces, wherein the external electrode includes a conductive resin layer located on at least the end surface, a first thickness of the conductive resin layer located on a central region of the end surface is greater than a second thickness of the conductive resin layer located on a peripheral region of the end surface, the external electrode further includes a sintered metal layer disposed on the element body, the conductive resin layer is disposed on the sintered metal layer, the sintered metal layer is disposed on the end surface and the side surface, and surface roughness of the sintered metal layer located on the side surface is greater than surface roughness of the sintered metal layer located on the peripheral region of the end surface.

12. An electronic component comprising:

an element body having a pair of end surfaces opposing each other and a side surface adjacent to the pair of end surfaces, and an external electrode disposed on the element body, and including a conductive resin layer, wherein the conductive resin layer includes a first portion disposed on the end surface and a second portion disposed on the side surface, and a first thickness of the first portion at a central region of the end surface is greater than a second thickness of the first portion at a peripheral region of the end surface; the peripheral region of the end surface not including a corner of the end surface.

13. The electronic component according to claim 12, wherein a third thickness of the second portion is greater than the second thickness.

14. The electronic component according to claim 12, wherein a third thickness of the second portion is less than the first thickness.

15. The electronic component according to claim 12, wherein a third thickness of the second portion is greater than the first thickness.

16. The electronic component according to claim 12, wherein the external electrode includes a sintered metal layer disposed between the element body and the conductive resin layer, the sintered metal layer including a third portion disposed on the end surface and a fourth portion disposed on the side surface, and a sixth thickness of the fourth portion is less than a fourth thickness of the third portion at the central region of the end surface, and greater than a fifth thickness of the third portion at the peripheral region of the end surface.

17. The electronic component according to claim 12, wherein the external electrode includes a sintered metal layer disposed between the element body and the conductive resin layer, the sintered metal layer including a third portion disposed on the end surface and a fourth portion disposed on the side surface, and surface roughness of the third portion at the central region of the end surface is greater than surface roughness of the third portion at the peripheral region of the end surface.

18. The electronic component according to claim 12, wherein the external electrode includes a sintered metal layer disposed between the element body and the conductive resin layer, the sintered metal layer including a third portion disposed on the end surface and a fourth portion disposed on the side surface, and surface roughness of the fourth portion is greater than surface roughness of the third portion at the peripheral region of the end surface.

19. The electronic component according to claim 12, wherein the external electrode includes a sintered metal layer disposed between the element body and the conductive resin layer, the sintered metal layer including a third portion disposed on the end surface, and a fourth thickness of the third portion at the central region of the end surface is greater than the first thickness.

20. The electronic component according to claim 12, wherein the external electrode includes a sintered metal layer disposed between the element body and the conductive resin layer, the sintered metal layer including a fourth portion disposed on the side surface, and a third thickness of the second portion is greater than a sixth thickness of the fourth portion.

21. The electronic component according to claim 12, wherein the external electrode includes a sintered metal layer disposed between the element body and the conductive resin layer, the sintered metal layer being in contact with the element body and the conductive resin layer.

22. The electronic component according to claim 12, wherein the external electrode includes a plating layer disposed on the conductive resin layer, the plating layer being in contact with the conductive resin layer.

23. An electronic component comprising:

an element body having a pair of end surfaces opposing each other and a side surface adjacent to the pair of end surfaces, and an external electrode disposed on at least one of the end surfaces, wherein the external electrode includes a conductive resin layer located on at least the end surface, a first thickness of the conductive resin layer located on a central region of the end surface is greater than a second thickness of the conductive resin layer located on a peripheral region of the end surface, and a thickness of the conductive resin layer on the end surface continuously decreases from the first thickness toward the second thickness.

24. An electronic component comprising:

an element body having a pair of end surfaces opposing each other and a side surface adjacent to the pair of end surfaces, and an external electrode disposed on the element body, and including a conductive resin layer, wherein the conductive resin layer includes a first portion disposed on the end surface and a second portion disposed on the side surface, a first thickness of the first portion at a central region of the end surface is greater than a second thickness of the first portion at a peripheral region of the end surface, and a thickness of the conductive resin layer on the end surface continuously decreases from the first thickness toward the second thickness.

25. The electronic component according to claim 24, wherein a third thickness of the second portion is greater than the second thickness.

26. The electronic component according to claim 24, wherein a third thickness of the second portion is less than the first thickness.

27. The electronic component according to claim 24, wherein a third thickness of the second portion is greater than the first thickness.

28. The electronic component according to claim 24, wherein the external electrode includes a sintered metal layer disposed between the element body and the conductive resin layer, the sintered metal layer including a third portion disposed on the end surface and a fourth portion disposed on the side surface, and a sixth thickness of the fourth portion is less than a fourth thickness of the third portion at the central region of the end surface, and greater than a fifth thickness of the third portion at the peripheral region of the end surface.

29. The electronic component according to claim 24, wherein the external electrode includes a sintered metal layer disposed between the element body and the conductive resin layer, the sintered metal layer including a third portion disposed on the end surface and a fourth portion disposed on the side surface, and surface roughness of the third portion at the central region of the end surface is greater than surface roughness of the third portion at the peripheral region of the end surface.

30. The electronic component according to claim 24, wherein the external electrode includes a sintered metal layer disposed between the element body and the conductive resin layer, the sintered metal layer including a third portion disposed on the end surface and a fourth portion disposed on the side surface, and surface roughness of the fourth portion is greater than surface roughness of the third portion at the peripheral region of the end surface.

31. The electronic component according to claim 24, wherein the external electrode includes a sintered metal layer disposed between the element body and the conductive resin layer, the sintered metal layer including a third portion disposed on the end surface, and a fourth thickness of the third portion at the central region of the end surface is greater than the first thickness.

32. The electronic component according to claim 24, wherein the external electrode includes a sintered metal layer disposed between the element body and the conductive resin layer, the sintered metal layer including a fourth portion disposed on the side surface, and a third thickness of the second portion is greater than a sixth thickness of the fourth portion.

33. The electronic component according to claim 24, wherein the external electrode includes a sintered metal layer disposed between the element body and the conductive resin layer, the sintered metal layer being in contact with the element body and the conductive resin layer.

34. The electronic component according to claim 24, wherein the external electrode includes a plating layer disposed on the conductive resin layer, the plating layer being in contact with the conductive resin layer.

* * * * *